United States Patent [19]

Tajima

[11] Patent Number: 5,045,868
[45] Date of Patent: Sep. 3, 1991

[54] OPTICAL RECORDING APPARATUS FOR VARYING PIT WIDTH ACCORDING TO RECORDING WAVELENGTH

[75] Inventor: Osamu Tajima, Ibaraki, Japan

[73] Assignee: Victor Company of Japan, Ltd., Yokohama, Japan

[21] Appl. No.: 355,849

[22] Filed: May 18, 1989

Related U.S. Application Data

[63] Continuation of Ser. No. 1,467, Jan. 8, 1987.

[30] Foreign Application Priority Data

Jan. 8, 1986 [JP] Japan .................................. 61-1514
Jan. 8, 1986 [JP] Japan .................................. 61-1515
Jan. 8, 1986 [JP] Japan .................................. 61-1516

[51] Int. Cl.$^5$ .............................................. C01D 9/42
[52] U.S. Cl. .................................. 346/108; 369/44.24
[58] Field of Search ............... 346/76, 107 R, 108, 346/160; 358/296, 297, 298; 369/100, 116, 111, 43, 46

[56] References Cited

U.S. PATENT DOCUMENTS

| | | | |
|---|---|---|---|
| 3,841,733 | 10/1974 | Ebersole | 346/108 |
| 4,118,734 | 10/1978 | Bouwhuis et al. | |
| 4,327,430 | 4/1982 | Wade | 369/111 |
| 4,449,215 | 5/1984 | Renio | 369/111 |

OTHER PUBLICATIONS

Applied Optics, vol. 17, No. 13, Jul. 1, 1978, pp. 1993-2000, Eindhoven, NL; G. Bouwhuis et al.: "Video Disk Player Optics".
"Optical Techniques Developed for the RCA Video Disc" by I. Gorog; RCA Review vol. 39, No. 1, Mar. 1978, pp. 162-185.
"Optical Readout of the RCA Video Disc" by A. H. Firester et al. RCA Review vol. 39, No. 3, 1978, pp. 392-426.

Primary Examiner—Mark J. Reinhart
Attorney, Agent, or Firm—Cushman, Darby & Cushman

[57] ABSTRACT

Disclosed are an information signal recording medium having pits which are formed in a geometric concave or convex configuration for recording information signals and on which a light spot is applied for reproduction of the information signals, a recording apparatus for optically recording the information signals thereon and a reproducing apparatus for optically reproducing the information signals therefrom. In the information signal recording medium, a pit width of a first pit having a pit length substantially equal to half the longest recording wavelength is set to a first pit width smaller than the diameter of the light spot, a pit width of a second pit having a pit length substantially equal of half the shortest recording wavelength is set to a second pit width greater in dimension than the first pit width, and a pit width of a third pit having a pit length in-between the pit length substantially equal to half the longest recording wavelength and the pit length substantially equal to half the shortest recording wavelength is set to be equal to a pit width of a fourth pit having a pit length shorter than the pit length of the third pit or set to be smaller than the pit width of the fourth pit.

4 Claims, 10 Drawing Sheets

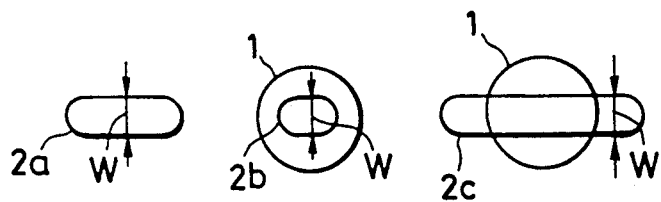
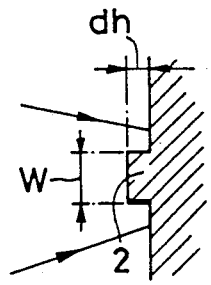
FIG. 1A PRIOR ART
FIG. 1B PRIOR ART
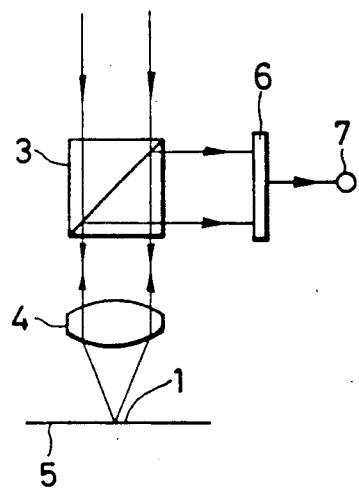
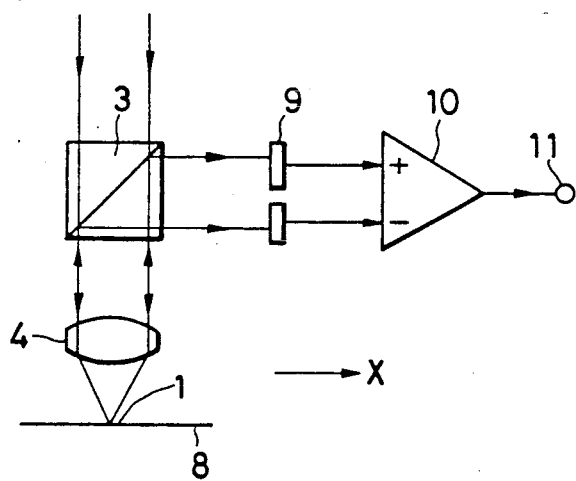
FIG. 2A PRIOR ART
FIG. 2B PRIOR ART

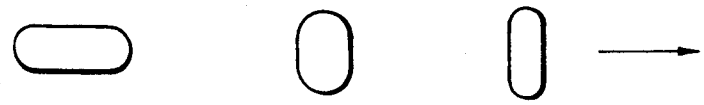
FIG. 18A  FIG. 18B  FIG. 18C
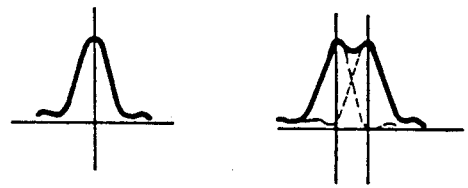
FIG. 19A  FIG. 19B  FIG. 20
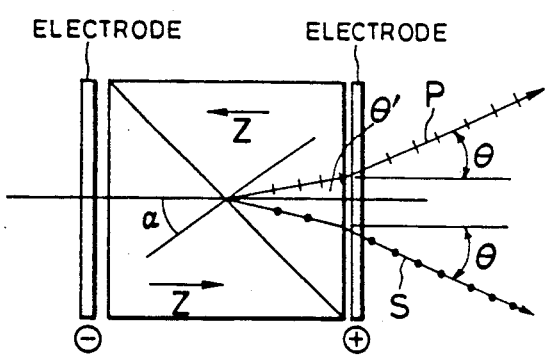
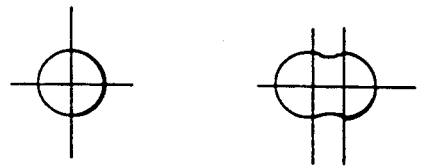
FIG. 19C  FIG. 19D
FIG. 21
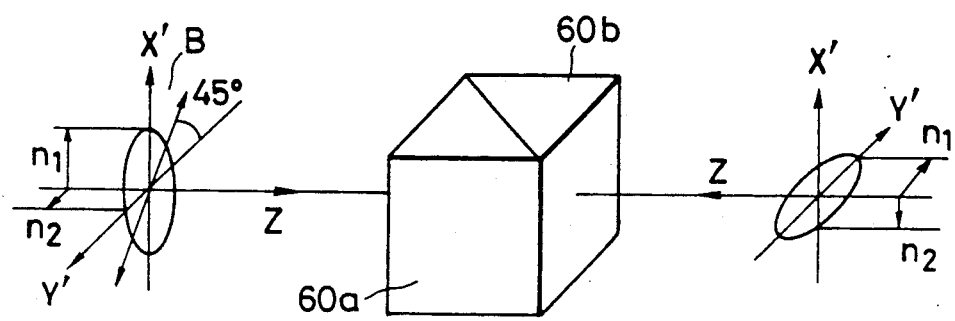

OPTICAL RECORDING APPARATUS FOR VARYING PIT WIDTH ACCORDING TO RECORDING WAVELENGTH

This is a continuation of application No. 07/001,467, filed Jan. 8, 1987, which was abandoned upon the filing hereof.

BACKGROUND OF THE INVENTION

The present invention relates generally to optical recording/reproducing of information signals, and more particularly to an information signal recording medium having pits corresponding to information signals, and recording apparatus for optically forming the pits thereon in accordance with the information signals and reproducing apparatus for optically reproducing the information signals therefrom.

Various types of optical recording/reproducing systems have been developed to optically record information signals by pits formed in concave or convex configuration on an information medium and to optically reproduce the information signals from the pits recorded thereon. One known reproducing system is a so-called LV system which illuminates an information signal recording medium with a light spot having a diameter greater in dimension than the width of the pits recorded thereon. Another known reproducing system is a so-called differential system which is arranged to obtain a reproduction signal by subtraction between the output signals of two divided photo deflectors receiving light reflected from an information signal recording medium due to application of a light spot whose diameter is smaller in dimension than the width of the pits. Both the systems respectively have advantages and disadvantages, and therefore, it would be advantageous to provide an optical recording/reproducing system having only the advantages of both the systems. However, difficulty is encountered to meet the requirement because there is a great difference between the characteristics of both the systems. Thus, a further improvement would be required from the viewpoint of meeting the requirements imposed in resolution of the disadvantages of the conventional information signal recording/reproducing systems.

SUMMARY OF THE INVENTION

The present invention has been developed in order to eliminate the drawbacks inherent in the conventional information signal recording/reproducing systems.

It is therefore an object of the present invention to provide a new information signal recording medium having pits which are capable of eliminating the disadvantages of the conventional recording/reproducing systems.

Another object of the invention is to provide an improved information signal reproducing apparatus for optically reproducing information signals from the recording medium.

A further object of the invention is to provide an improved information signal recording apparatus which optically forms the pits on the recording medium.

In accordance with the present invention, there is an information signal recording medium having pits which are formed in geometric concave or convex configuration for recording information signals and on which a light spot is applied for reproduction of the information signals. In the information signal recording medium, a pit width of a first pit having a pit length substantially equal to half the longest recording wavelength is set to a first pit width smaller than the diameter of the light spot, a pit width of a second pit having a pit length substantially equal to half the shortest recording wavelength is set to a second pit width greater in dimension than the first pit width, and a pit width of a third pit having a pit length in-between the pit length substantially equal to half the longest recording wavelength and the pit length substantially equal to half the shortest recording wavelength is set to be equal to a pit width of a fourth pit having a pit length shorter than the pit length of the third pit or set to be smaller than the pit width of the fourth pit.

In accordance with the present invention, there is further provided an optical information signal reproducing apparatus for reproducing information signals from an information signal recording medium by irradiating a light spot on the information signal recording medium on which the information signals are recorded with pits formed in a geometric concave or convex configuration, comprising: a photo detector, having two photosensitive elements divided into two on an optical axis in a recorded trace-arranged direction in the information signal recording medium within a light path of a reflected light resulting from the light spot irradiated on a signal surface of the information signal recording medium; a first adder for producing a sum signal of output signals of the two photosensitive elements of the photo detector; a subtractor for producing a difference signal between the output signals of the two photosensitive elements of the photo detector; a phase shift circuit for coinciding the phase of the output signal of the first adder with the phase of the output signal of the subtractor; and a second adder for producing a sum signal of both the output signals of the first adder and the subtractor coincident in phase with each other, the output signal of the second adder being a reproduced information signal.

In accordance with the present invention, there is also provided an optical information signal reproducing apparatus for reproducing information signals from an information signal recording medium by irradiating a light spot on the information signal recording medium on which the information signals are recorded with pits formed in a geometric concave or convex configuration, comprising: a photo detector having two photosensitive elements divided into two an optical axis in a direction intersecting a recorded trace-arranged direction in the information signal recording medium within a light path of a transmission light resulting from the light spot irradiated on a signal surface of the information signal recording medium; a first adder for producing a sum signal of output signals of the two photosensitive elements of the photo detector; a subtractor for producing a difference signal between the output signals of the two photosensitive elements of the photo detector; a phase shift circuit for coinciding the phase of the output signal of the first adder with the phase of the output signal of the subtractor; and a second adder for producing a sum signal of both the output signals of the first adder and the subtractor coincident in phase with each other, the output signal of the second adder being a reproduced information signal.

In accordance with the present invention, there is further provided an optical information signal recording apparatus for recording an information signal on an information signal recording medium by means of a pit formed in a geometric concave or convex configuration by irradiating a light spot obtained by condensing a light beam intensity-modulated in accordance with the information signal, the pit width of the pit being varied in accordance with the recording wavelength, the recording apparatus comprising a deflection element made of an electro-optical crystal for dividing light symmetrically in two directions with respect to the optical axis, the deflection element being within the light path and changing the cross-sectional configuration of a light beam to vary the pit width of the pit in accordance with the recording wavelength.

BRIEF DESCRIPTION OF THE DRAWINGS

The objects and features of the present invention will become more readily apparent from the following detailed description of the preferred embodiments taken in conjunction with the accompanying drawings in which:

FIGS. 1A, 1B are illustrations for describing the relation between the diameter of a light spot applied to a conventional information signal recording medium and the pit width of the pits thereof;

FIG. 2A is a schematic diagram showing a conventional producing apparatus according to an LV system;

FIG. 2B shows the outline of arrangement of a conventional reproducing apparatus according to a differential system;

FIGS. 18A, 18B and 18C are illustrations for describing that the pit width of pits recorded by the FIG. 17 recording apparatus is varied in accordance with the recording wavelength;

FIGS. 19A-19B are diagrams showing the principle in which the pit width is varied in dimension with the laser light beam being divided by the deflection element into two;

FIGS. 20 and 21 are showing one example of the deflection element of the FIG. 17 recording apparatus;

DETAILED DESCRIPTION OF THE INVENTION

Figure 3:
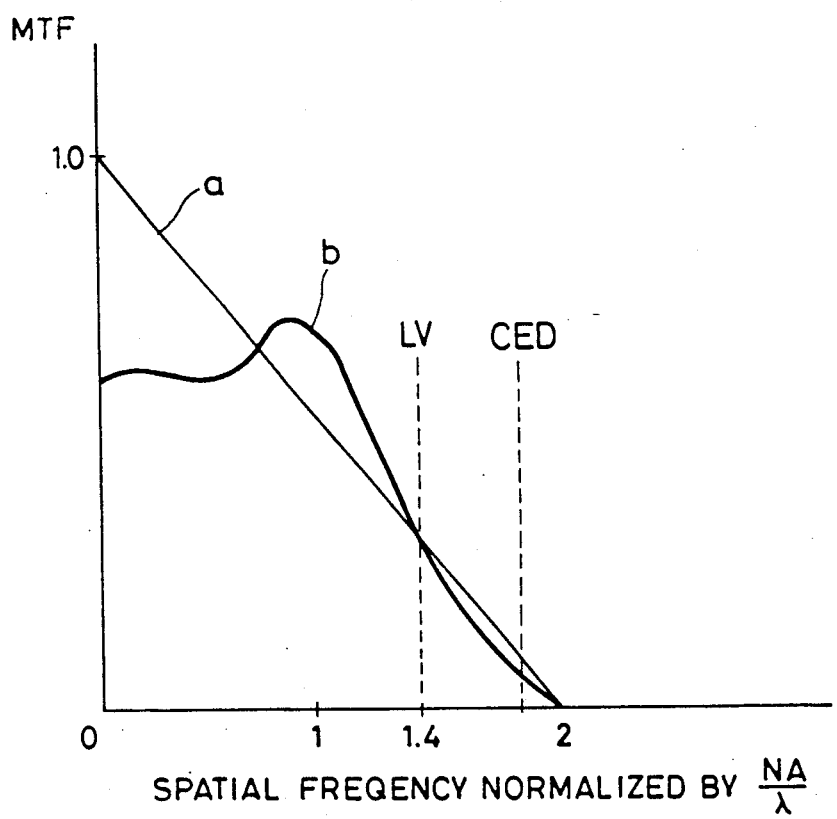
FIG. 3 shows a graphic diagram showing MTF with respect to period.

Prior to describing embodiments of the present invention, a further detailed description of the above-mentioned prior reproducing systems will be first made with reference to the drawings for a better understanding of the invention.

An optical information signal reproducing system generally widely used is a so-called LV system, in which the reproduction of information signals is performed by application of a light spot to a signal-recorded surface of an information signal recording medium on which the information signals are recorded using pits formed in a geometric concave or convex configuration. The LV system is arranged such that a light spot having a diameter greater in dimension than the pit width of the pits formed in a geometric concave or convex configuration is applied to an information signal recording medium to reproduce the information signals recorded thereon. In the LV system, the relation between the diameter of the spot of light applied to the information signal recording medium and the width of the pits is shown in FIGS. 1A, 1B.

In FIG. 1A, illustrated at references 2a, 2b, 2c are pits having pit lengths respectively equal to halves of different recording wavelengths. The reference character W represents the pit width and numeral 1 designates light spots. On the other hand, in FIG. 1B, numeral 2 is a pit (a pit is represented simply with 2 in the case that it is not required to distinguish one pit from others). The reference W similarly depicts the pit width and character dh is the pit depth (or height). The pit depth (or height) dh is substantially one-fourth of the wavelength of light to be applied thereto.

In the LV system, in the case that the light spot 1 is applied to both the pit and land area in substantially equal proportion, zero-order reflection light becomes a local minimum. On the other hand, when the whole of the light spot 1 is applied to the land area, the zero-order reflection light becomes a local maximum. Even if the light spot 1 is applied to both the pit area and land area, in the case of illuminating the whole of a pit 2b with the light spot 1 as shown the figure, the light spot is applied to the whole of a pit, and the intensity of zero-order reflection light becomes greater as compared with the zero-order reflection light intensity in the above-mentioned condition wherein the light spot 1 is applied to the pit and land in equal proportion.

FIG. 2A is a schematic diagram showing a reproducing apparatus according to the LV system. The reproducing apparatus comprises a beam splitter 3, a condensing lens 4, a photo detector 6 and an output terminal 7. Numeral 5 is an information signal recording medium (disc). Light from a light source, not shown, is condensed by the condensing lens after passing through the beam splitter 3 whereby a microscopic light spot 1 is applied to the disc 5.

A light ray reflected from the disc 5 due to the light spot 1 is, incident through the condensing lens 4 on the beam splitter 3 and thereat reflected toward the photo detector 6. The reflected light ray is photoelectric-converted by the photo detector 6, the output of which is supplied to the output terminal 7. In terms of the quantity of the light reflected from the signal surface of the disc 5 (diffracted light due to the pit of the signal surface), as described above, the zero-order reflection light becomes a local minimum when the spot 1 is applied to both a pit and a land in substantially equal proportion as in the case of the light spot 1 of FIG. 1A illuminating the pit 2c, and on the other hand, the zero-order reflection light becomes a local maximum when the light spot 1 is entirely placed on the land area. Furthermore, even if the light spot is applied to both the pit and land, the zero-order reflection light becomes greater than the former local minimum case when the pit is wholly covered by the light spot 1 as in the case, of the light spot 1 illuminating the pit 2b in FIG. 1A. Therefore, a signal corresponding to the quantity of the reflected light is outputted from the photo detector 6, thereby enabling the reproduction of the information signals recorded on the disc 5.

Figure 4:
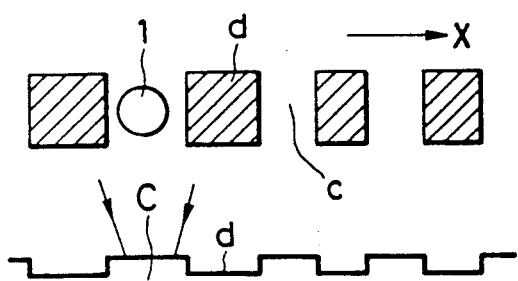
FIG. 4 is an illustration for describing the relation between pits and light spot in the case that the MTF characteristic indicated by the curved line a in FIG. 3 is obtained by a reproducing apparatus according to the LV system as shown in FIG. 2A.

It is known that the transmission capacity of the spatial frequency (modulation transfer function; MTF) in terms of lenses is indicated by a curved line a in FIG. 3. When a pattern, comprising a reflection surface c having a width greater in dimension than the diameter of the light spot 1 and a non-reflection surface d as shown in FIG. 4, is read by a reproducing apparatus according to the LV system shown in FIG. 2A, the MTF corresponds to the response of the MTF curved line a shown in FIG. 3. FIG. 3 shows the fact that, if the period of array pattern of the reflection surface is represented using the wavelength $\lambda$ of light, and the numerical aperture NA, the MTF is zero. That is, the reproduction signal is absent when the period of the reflection surface array pattern is $\lambda/(2NA)$.

Furthermore, when a light spot having a diameter greater in length than the width of pits formed in the geometric concave or convex configuration is emitted to the signal-recorded surface of an information signal recording medium in order to reproduce the information signals therefrom, although the MTF does not assume the curved line a in FIG. 3 when NA/$\lambda$ is small, the MTF assumes a curved line similar thereto as a whole. In the above-mentioned LV system, the information signal is recorded up to a spatial frequency indicated by a dotted line LV in FIG. 3, and the spatial frequency is approximately 1.4 in unit of NA/$\lambda$ when the numerical aperture NA of the condensing lens is 0.5 and the wavelength $\lambda$ of light is 780 nm, for example.

FIG. 2B shows the outline of an arrangement of a reproducing apparatus according to the differential system described in detail in "RCA REVIEW" (May, 1978, VOL39, NO.1). The reproducing apparatus according to the differential system includes a beam splitter 3, a condensing lens 4, a photo detector 9 having two photosensitive elements separated on the optical axis in the direction perpendicular to the advancing direction of the light spot, a subtractor 10 and an output terminal 11. Numeral 8 is an information signal recording medium (disc). Light from a light source, not shown, is condensed by the condensing lens 15 4 after passing through the beam splitter 3, whereby a microscopic light spot 1 is applied to the disc 8. The light reflected from the disc 8 due to the application of the light spot 1 thereto is incident through the condensing lens 4 on the beam splitter 3 and then reflected toward the photo detectors 9. The reflected light is photoelectric-converted in the two photosensitive elements and the output signals of the two photosensitive elements thereof is subtracted therebetween in the subtractor 10. The output signal of the subtractor 10 is supplied to the output terminal 11.

In the reproducing apparatus according to the differential system shown in FIG. 2B, as indicated by a curved line b in FIG. 3, the MTF is higher in response as compared with that of the curved line a when the period is in the vicinity of 1 and, on the other hand, is lower in response in the condition of other than the vicinity of 1. However, according to the above-mentioned literature relating to the differential system, it is written that a reproduction signal as good as C/N = 60 dB (BW 30 kHz) can be obtained when the signal is reproduced at the position corresponding to CED indicated by a dotted line in FIG. 3.

In a system to obtain a reproduction signal by subtraction between signals such as the reproducing apparatus according to the differential system shown in FIG. 2B, the reason that it is possible to obtain a good reproduction signal irrespective of a low MTF is that the optical noises due to a light source such as a semiconductor laser is eliminated by the subtraction between signals.

Figure 5:
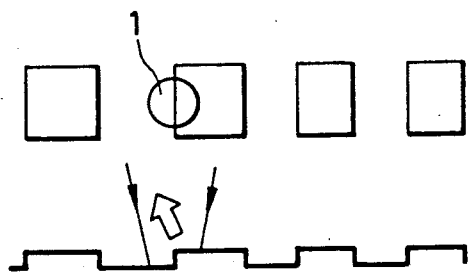
FIG. 5 is an illustration for describing the relation in the differential system between pits and light spot.
Figure 6:
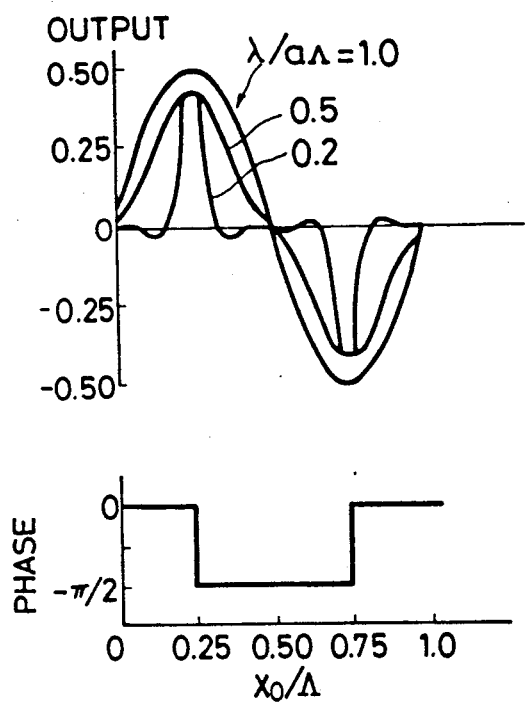
FIG. 6 is an illustration for describing signals reproduced in accordance with the differential system from pits resulting from different recording wavelengths.

The above-mentioned differential system is also suitable for the case of performing the reproduction of an information signal from an information signal recording medium with an array pattern of pits having the width greater in dimension than the diameter of the light spot 1 as shown in FIG. 5. FIG. 6 shows response characteristics with respect to the recording wavelength $\Lambda$ and the spot characteristic value ($\lambda$/a), where a=NA when the phase difference corresponding to the optical path difference in going and returning due to the unevenness is $\pi/2$. In the differential system, when the recording wavelength $\Lambda$ is great, that is, when $\lambda/a\Lambda$ is small, the waveform representing the response becomes sharp. This means that the differential system is basically suitable for reproduction in terms of pits having a wide width and in the case that the recording wavelength is short.

Figure 7:
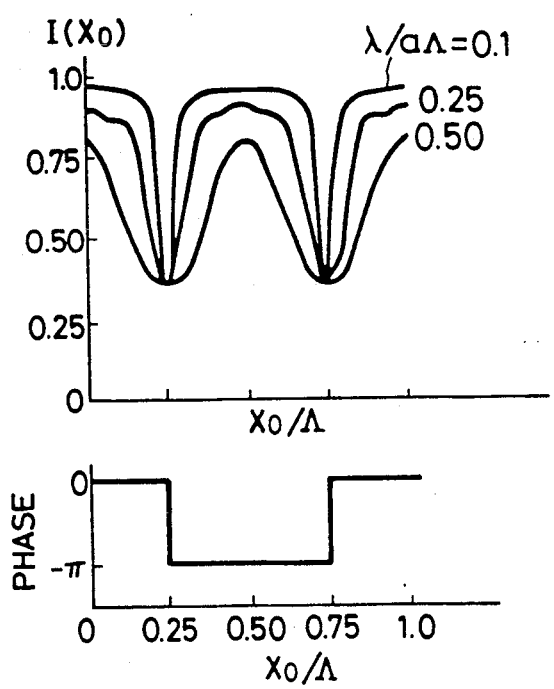
FIG. 7 s an illustration for describing signals reproduced in accordance with the LV system.

However, when the information signals are reproduced from an information signal recording medium with an array pattern of pits having a pit width greater in dimension than the diameter of the light spot 1 using the reproducing apparatus arranged as shown in FIG. 2B, as obvious is from FIG. 7, the response occurs only at edge portions of the pit and thus it is impossible to perform the reproduction in terms of the concave and convex configurations.

Figure 8A:
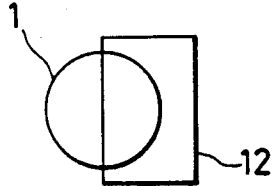
FIGS. 8A and 8B are illustrations for describing diffracted light produced due to a pit.
Figure 8B:
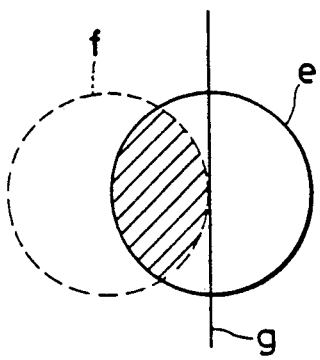

FIGS. 8A and 8B are illustrations for describing the condition of the diffracted light produced due to a pit 12 having the pit width by which a good reproduction signal can be obtained by the reproducing apparatus according to the differential system, or which is greater in dimension than the diameter of the light spot 1. Of these figures, FIG. 8A shows the condition that the center of the light spot 1 is applied to an edge of the pit 12 and the light spot 1 is divided thereby into two. On the other hand, FIG. 8B shows the relation between a distribution f of the diffracted light produced when the light spot 1 is divided into two by the left side edge of the pit 12 and the aperture e of a condensing lens. Light corresponding to the portion indicated by oblique lines in the drawing passes through the condensing lens and reaches the photo detector 9, and therefore, the light is incident on only one photosensitive element of the photo detector 9 which is distinguished by a line g, and the output of the subtractor 10 corresponds to the information signal at the left edge of the pit 12. Thus, the differential system can be employed for a disc having pits by which the light spot 1 is divided into two.

Figure 9A:
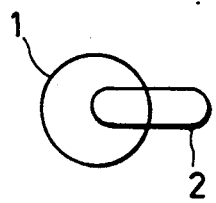
FIGS. 9A and 9B are illustrations for describing diffracted light produced due to another pit.
Figure 9B:
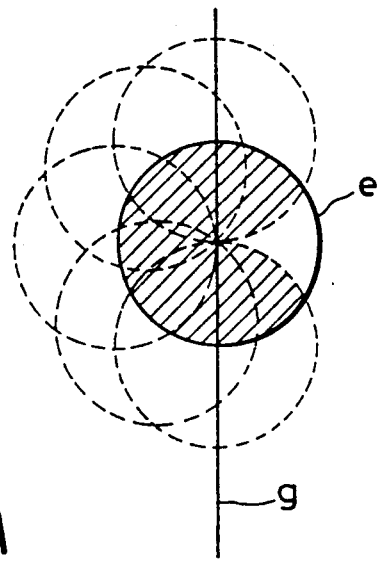

FIGS. 9A and 9B are illustrations for describing the condition of the diffracted light produced due to a pit 2 having a pit width by which a good reproduction signal cannot be obtained by a reproducing apparatus according to the differential system, or which is smaller in dimension than the diameter of the light spot 1. FIG. 9A shows the condition that the center of the light spot is applied to an edge of the pit 2 and FIG. 9B shows the relation between the distribution (a number of circles indicated by dotted lines which are respectively affected by various parts of the edge) of the diffracted light produced when the light spot 1 is positioned at the left side edge of the pit 2 as shown in FIG. 9A and the aperture e of the condensing lens.

When the center of the light spot 1 is positioned at an edge of a pit having a pit width smaller in dimension than the diameter of the light spot 1, even if the depth (or height) of the pit 2 is $\lambda/8$, which is a value suitable for producing the biased diffraction, the light spot is not linearly divided by the edge of the pit, resulting in the distribution as shown in FIG. 9B. Light corresponding to only the portion indicated by oblique lines in the drawing reaches the photo detector 9 after passing through the condensing lens. The light is incident on both the photosensitive elements of the photo detector 9 which are distinguished from each other with a line g, and therefore, a good reproduction signal due to the pit 2 cannot be obtained from the subtractor 10. Thus, the differential system is not suitable for the read out of information signals from a disc, such as a disc in the LV system, having a pit by which the light spot 1 cannot be divided into two.

The features of the above-mentioned LV system and differential system are shown in the following table (1).

TABLE 1

|  | LV System | Differential System |
| --- | --- | --- |
| Pit Width | smaller than diameter of light spot (about ½) | greater than diameter of light spot |
| Optimal Pit Depth | ¼ of wavelength | ⅛ of wavelength |
| Merits | good low-band reproduction duty cycle modulation usable | good high-band C/N (1.3 times C/N in LV system) large middle band response |
| Demerits | bad high band | duty cycle |

TABLE 1-continued

| LV System | Differential System |
| --- | --- |
| characteristic | modulation unusable |

As obvious from the detailed description with respect to the prior art techniques, the LV system and the differential system have respectively advantages and disadvantages. To produce an information signal recording apparatus so as to have only the advantages of both systems would result in enabling provision of a higher density information signal recording apparatus. However, difficulty is encountered to obtain the information signal recording medium having the advantages of both the systems because there is a great difference in surface configuration of pits therebetween and further there is a difference in characteristics therebetween as described with reference to the drawings.

Hereinbelow, an information signal recording medium according to the present invention will be described in detail with reference to other drawings.

Figure 10A:
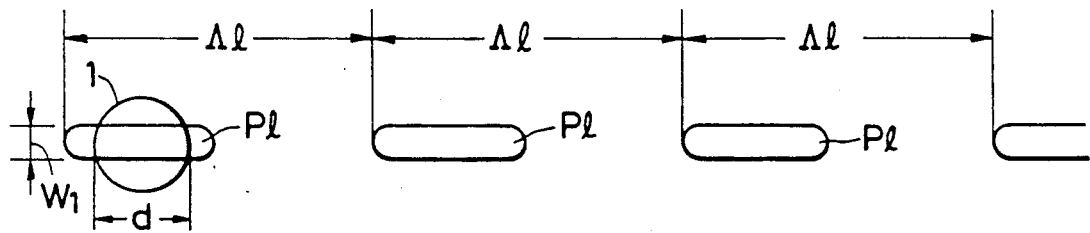
FIGS. 10A, 10B and 10C are diagrams showing plan views of pits formed according to the present invention.
Figure 10B:
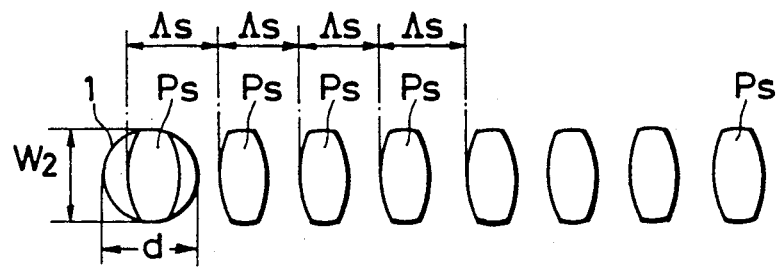
Figure 10C:
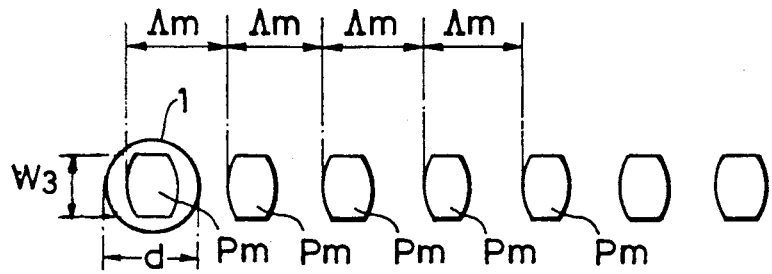

FIGS. 10A, 10B and 10C are diagrams respectively showing a plan view of pits formed in a geometric concave or convex configuration and a light spot 1 applied thereto. Of these drawings, FIG. 10A is a plan view illustrating pits Pl among pits recorded on an information signal recording medium in accordance with information signals each having a pit length substantially equal to half the longest recording wavelength $\Lambda l$; Fig 10B is a plan view showing pits Ps each having the pit length substantially equal to half the shortest recording wavelength $\Lambda s$; and FIG. 10C is a plan view showing pits Pm having a pit length in-between the pit length substantially equal to half the longest recording wavelength $\Lambda l$ and the pit length substantially equal to half the shortest recording wavelength $\Lambda s$, for example, substantially equal to half a recording wavelength $\Lambda m$ ($\Lambda l > \Lambda m > \Lambda s$).

In the description of this embodiment, in expressing the pit length with respect to the recording wavelength, it is not expressed such that it is equal to the recording wavelength, but is expressed such that it is substantially equal to half the recording wavelength. The reason that "substantially" is used for expression is that the pit length may be slightly varied from half the recording wavelength, for example, because of application of duty cycle modulation and scattering of disc manufacturing conditions.

The pit Pl of FIG. 10A, having the pit length corresponding to half the longest recording wavelength $\Lambda l$ among pits recorded on an information signal recording medium, is set to have a first pit width W1 smaller in dimension than the diameter d of the light spot 1. When the diameter d of, the light spot 1 is given by $d = 0.82 \lambda/NA$ where $\lambda$ is the wavelength of light and NA is a numerical aperture of a lens forming the light spot, it is preferred that, for example, the first pit width W1 is set to substantially one-third of the diameter d of the light spot 1.

The pit Ps of FIG. 10B, having a pit length corresponding to half the shortest recording wavelength $\Lambda s$ among pits recorded on the information signal recording medium, is set to have a second pit width W2 greater in dimension than the pit width W1. When the diameter d of the light spot 1 is given by $d = 0.82 \lambda/NA$ where $\lambda$ is wavelength of light and NA is a numerical aperture of a lens forming the light spot, it is preferred that, for example, the second pit width W2 is set to be substantially equal to the diameter d of the light spot 1.

The pit Pm of FIG. 10C, having a pit length in-between the pit length corresponding to substantially half the longest recording wavelength Λl and the pit length corresponding to substantially half the shortest recording wavelength Λs such as a pit length corresponding to substantially half the recording wavelength Λm (Λl > Λm > Λs), is set to have a pit width equal to the pit width of a pit having a pit length smaller than the pit length of the pit Pm or is set to have a pit width smaller than the pit width of a pit having a pit length shorter than the pit length of the pit Pm.

In a method of setting the pit width of the pit having a pit length in-between the pit length substantially corresponding to half the longest recording wavelength Δl and the pit length substantially corresponding to half the shortest recording wavelength Λs, the pit width W3 is continuously varied between the first pit width W1 (minimum pit width) and the second pit width W2 (maximum pit width) to be inversely proportional to the pit length. In another method, the recording wavelengths between the longest recording wavelength Λl and the shortest recording wavelength Λs are divided into a plurality of groups in accordance with the magnitude of the wavelength, and each of the pit widths in-between the first pit width W1 (minimum pit width) and the second pit width W2 (maximum pit width) is set to correspond to each of the plurality of groups so that the pit width W3 is varied to correspond to each of the plurality of groups.

The depth (or height) of pits of the information recording medium according to the present invention is preferably set to a middle value, i.e., about $\lambda/5.3$, between the optimal value $\lambda/4$ of the pit depth (or height) in the LV system and the optimal value $\lambda/8$ of the pit depth (or height) in the differential system.

Thus, in an information signal recording medium according to the present invention, information signals are recorded using pits whose pit width is varied in accordance with recording wavelength, and the pit width of a pit in the region of the long recording wavelength is set to one-third (⅓) of the diameter of the light spot and the modulation degree due to diffraction on the pit becomes maximum with respect to the pit width, resulting in obtaining good reproduction signals. On the other hand, the pit width of a pit in the region of the short recording wavelength is set to be substantially equal in dimension to the diameter of the light spot, and therefore, the modulation degree due to diffraction with respect to the aperture of the condensing lens is increased since the diffraction effect in the direction that pits are arranged becomes great. It is also possible to output excellent signals in the differential system using the output signals from the two photosensitive elements divided in the pit arranging direction.

Secondly, a description will be made hereinbelow in terms of one example of recording apparatus for the information signal recording medium according to the present invention on which information signals are recorded by pits whose pit width is varied in accordance with the recording wavelength.

Figure 11:
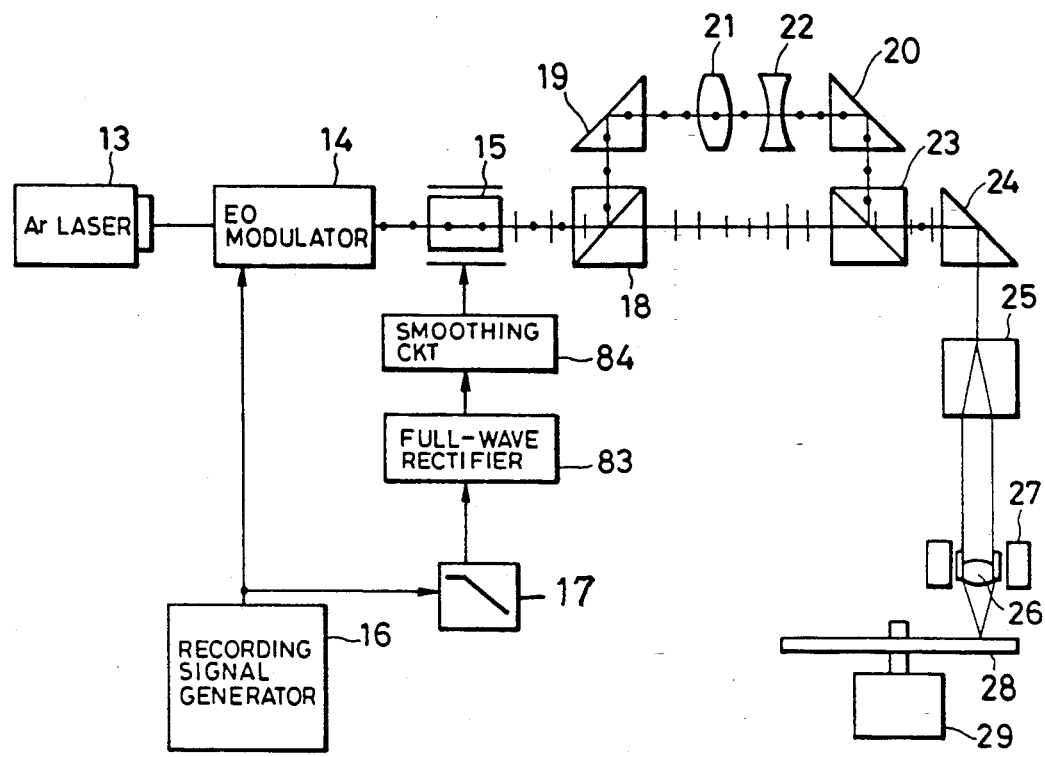
FIG. 11 is a block diagram showing an optical recording apparatus according to the present invention for recording information signals on an information signal recording medium.

FIG. 11 is a block diagram showing an information signal recording apparatus. In FIG. 11, illustrated at numeral 13 is a short wavelength argon laser for recording. Laser light emitted from the argon laser 13 is incident on an electro-optical light modulator 14 (which will hereinafter be referred to as EO modulator), which in turn performs the intensity modulation of the laser light in accordance with a signal supplied from a recording signal generator 16 and emits to an electronic shutter 15 S-polarized light having an electric field vector perpendicular to the drawing paper surface. As the electronic shutter 15 is used means arranged to produce double refraction in response to electric field. For example, means using the Kerr effect of an isotropic substance, Kerr effect of crystal or a Faraday effect can be employed therefor.

The electronic shutter 15 receives a signal from the recording signal generator 16 through a low-pass filter 17, a full-wave rectifier 83 and a smoothing circuit 84, thereby producing double refraction proportional to the magnitude of the electric field of the signal voltage supplied through the low-pass filter 17. The double refraction causes variation of phase of the light, which is in turn emitted therefrom and reaches a polarization prism 18. The polarization prism 18 causes S-polarized light to reflect upwardly and causes P-polarized light to pass therethrough.

Figure 12:
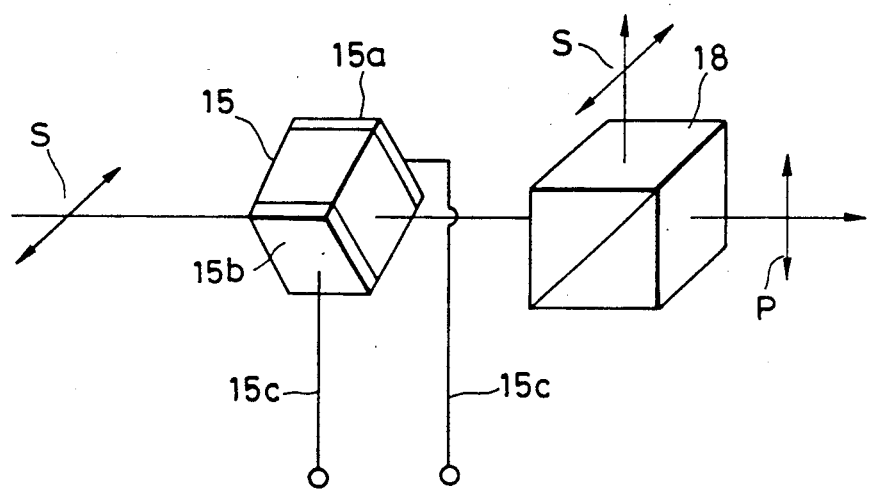
FIG. 12 is a perspective view for describing polarization directions in terms of an electronic shutter and a polarization prism.

FIG. 12 is a perspective view for describing the polarization directions with respect to the electronic shutter 15 and the polarization prism 18. In the figure, numerals 15a and 15b represent electrodes and numeral 15c designates electric wires provided for driving. The direction of the electric field in the electronic shutter 15 makes an angle of 45° with respect to the S-polarized light, and thus the main axis due to the electric field results in a 45°.

Now, in the electronic shutter 15, when the phase difference due to double refraction proportional to the magnitude of the electric field is 6, the intensity Is of S-polarized light reflected upwardly by the polarization prism 18 is given by $Is = 1 - \sin^2(\delta/2)$ ... (1). On the other hand, the intensity Ip of P-polarized light passing through the polarization prism 18 is given by $Ip = -\sin^2(\delta/2)$ ... (2). The relation between the magnitude of electric field and the magnitude of double refraction depends upon the type of the electronic shutter and the kind of the double refraction material.

Since the electronic shutter 15 provides the phase difference 6 proportional to the magnitude of the electric field to the laser light, the S-polarized light determined by the phase difference δ as shown in the equation (1) is reflected upwardly by the polarization prism 18 and advances to one optical path. The P-polarized light represented by the equation (2) passes through the polarization prism 18 and advances to another optical path.

Returning back to FIG. 11, the S-polarized light reflected upwardly by the polarization, prism 18 is reflected by a right prism 19 before being diverged by a very small angle with respect to one direction by the actions of cylindrical lenses 21, 22, and then is incident on a polarization prism 23 after being reflected by a right, prism 20, and further reaches a right prism 24 after being reflected by the polarization prism 23. On the other hand, P-polarized light which has passed through the polarization prism 18 is incident on the polarization prism 23, and then reaches the right prism 24 after passing through the polarization prism 23.

The S-polarized light and P-polarized light incident on the right prism 24 are reflected thereby and then reach a beam expander 25. After expanded there, they are supplied to a condensing lens 26 whereby a microscopic light spot is formed on a sensitive material layer of a recording disc 28. Numeral 27 is an actuator of an automatic focusing apparatus and numeral 29 is a drive device of the recording disc 28.

Figures 13A, 13B:
FIGS. 13A and 13B are diagrams showing the configurations of light spots.

FIG. 13A shows a light spot with circular cross-section which is formed on the recording disc 28 with the P-polarized light passed through the polarization prisms 18 and 23 being condensed by a condensing lens 26, and FIG. 13B shows a light spot with elliptic cross-section which is formed on the recording disc 28 with the S-polarized light passed through the polarization prism 18, right prism 19, cylindrical lenses 21, 22, right prism 20 and polarization prism 23 being condensed by the condensing lens 26.

Figure 14:
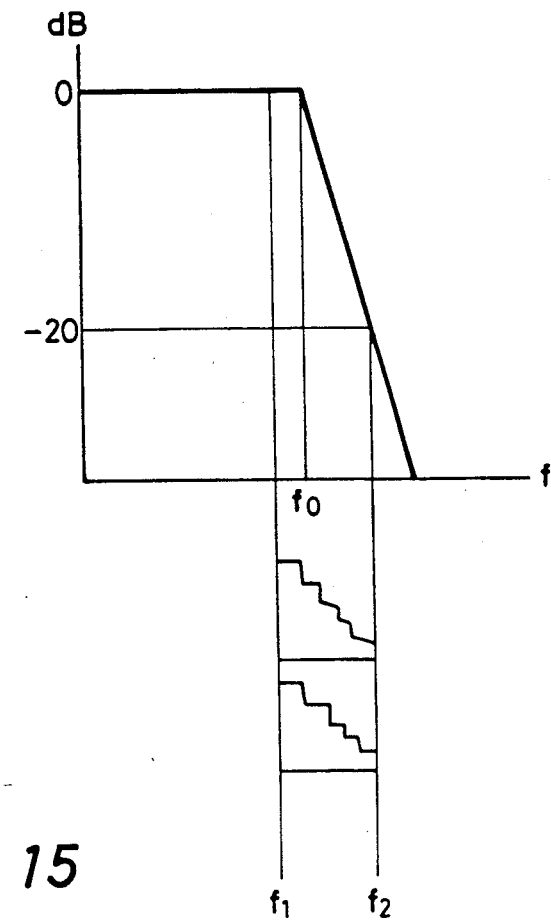
FIG. 14 shows the characteristic of a low-pass filter.

When a signal with a frequency passing through the low-pass filter 17 is set so that light produces 180° phase difference due to double refraction resulting from the supply to the electronic shutter 15 and when the characteristic of the low-pass filter 17 is determined as shown in FIG. 14 so that the turning frequency of is present in the range of frequencies f1 to f2, the phase of light passing through the electronic shutter 15 is shifted by 180° phase in response to signals with frequencies between f1 and f2 among information signals being passed through the low-pass filter 17 and being supplied to the electronic shutter 15, and therefore, the S-polarized light becomes Is=0 and the P-polarized light becomes Ip=1. Thus, the P-polarized light Is emmitted from the electronic shutter 15 is supplied from the polarization prism 18 through the polarization prism 23, right prism 24 and bean splitter 25 to the condensing lens 26, whereby a circular light spot shown in FIG. 13A is formed on the recording disc 28.

Furthermore, when the frequency of the information signal is higher than of, the voltage of the signal passing through the low-pass filter 17 is lowered, and therefore, the phase shift amount of light by the electronic shutter 15 becomes smaller than 180°. When the response of the low-pass filter 17 at frequency f2 is $-20$ dB with respect to the pass band, the phase shift $\delta$ provided to the light at the frequency f2 is given by $67 = \pi/10$ and the S-polarized light Is is given by Is=0.98.

The S-polarized light Is emitted from the electronic shutter 15 in this condition is supplied through the polarization prism 18, cylindrical lenses 21, 22, right prism 20, polarization prism 23, right prism 24 and beam splitter 25 to the condensing lens 26, and it is condensed by the condensing lens 26 so that a substantially elliptic light spot as shown in FIG. 13B is formed on the recording disc 28. In the above-mentioned example, the P-polarized light Ip=0.02 emitted from the electronic shutter 15 is supplied through the polarization prism 18, polarization prism 23, right prism 24 and beam splitter 25 to the condensing lens 26, and it is condensed by the condensing lens 26 and the circular light spot as shown in FIG. 13A is formed on the recording disc 28 so as to be superimposed on the elliptic light spot due to the S-polarized light.

Thus, using the recording apparatus as shown in FIG. 11, it is possible to form, as shown in FIGS. 10A, 10B and 10C, the pit width W1 of the pit Pl in response to an information signal producing the longest recording wavelength $\Lambda$s, and the pit width W2 of the pit Ps in response to an information signal producing the shortest recording wavelength $\Lambda$s, and the pit width W3 of the pit Pm in response to an information signal producing a recording wavelength Am in-between the longest recording wavelength $\Lambda$l and the shortest wavelength $\Lambda$s.

It is preferred that the pit width W2 of the pit Ps due to the information signal producing the shortest recording wavelength $\Lambda$s, as shown in FIG. 10B, is substantially equal to the diameter of the light spot 1. This is because the cross talk between adjacent recorded traces increases when the pit width is unnecessarily made great. Furthermore, the pit Pm caused by the information signal producing the recording wavelength $\Delta$m in-between the longest recording wavelength $\Lambda$l and the shortest recording wavelength $\Lambda$s takes an average between the pit Pl due to the information signal producing the longest recording wavelength $\Lambda$l and the pit Ps due to the information signal producing the shortest recording wavelength As. The resultant pit width becomes slightly narrow because the intensities at both ends of the pit is as low as less than recording threshold value.

A stamper is made by known manufacturing techniques on the basis of the recording disc 28 on which information signals are recorded by means of the recording apparatus as shown in FIG. 11, and a transparent plastic replica is made in accordance with the made stamper. It is possible to reproduce a number of information signal recording media by attaching metallic reflection film to the signal surface of the replica.

The arrangement in which the metallic reflection film is not attached to the signal surface of the replica results in a light passing type information recording medium. However, the optimal values of the pit depth in the light passing type and light reflection type are different from each other. Furthermore, the pit depth (or height) of the recording disc 28 depends upon the thickness of a photosensitive film used on recording. In addition, since the pit width of pits of the information signal recording medium according to the present invention is required to be lengthened as the recording wavelength becomes short, it is proper that the power of the drive source of the EO modulator 14 in FIG. 11 is increased at the high frequency band.

Secondly, a description will be made hereinbelow in terms of a reproducing apparatus for reproducing information signals from the information signal recording medium according to the present invention.

Figure 15:
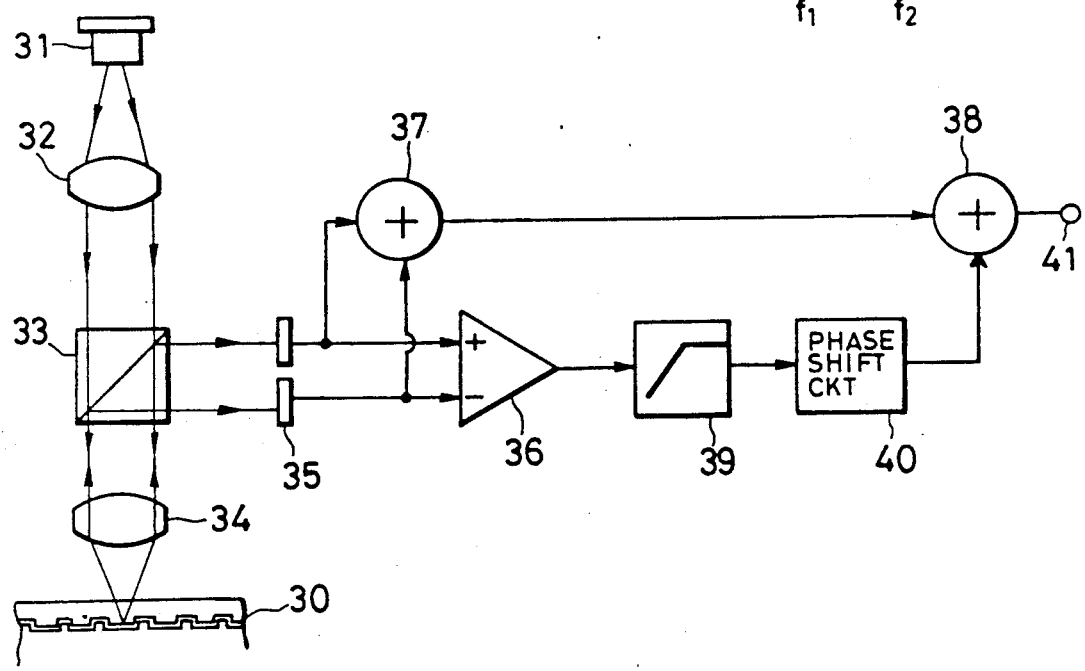
FIG. 15 is a block diagram illustrating an optical information signal reproducing apparatus according to an embodiment of the present invention.

FIG. 15 is a block diagram showing a reproducing apparatus according to an embodiment of the present invention. In FIG. 15, numeral 31 represents a semiconductor laser light source, numeral 32 designates a collimating lens, numeral 33 is a beam splitter, and numeral 34 is a condensing lens for forming a read out spot. Information signals recorded on an information signal recording medium 30 (disc 30) are read out from the flat surface side of a transparent plastic thereof.

Illustrated at numeral 35 is a photo detector for receiving reflection light from the disc 30 and for converting it into an electrical signal. The photo detector 35 has two photosensitive elements provided at positions divided on the light axis in the direction perpendicular to the light spot advancing direction. Numeral 36 is a subtractor, numerals 37 and 38 are adders, numeral 39 is a high-pass filter, numeral 40 represents a phase shift circuit and numeral 41 is an output terminal.

In the reproducing apparatus shown in FIG. 15, laser light emitted from the semiconductor laser 31 is collimated by the collimating lens 32, and then is incident on the condensing lens 34 through the beam splitter 33. The light incident on the condensing lens 34 is illuminated on the signal surface of the disc 30 in the form of a microscopic spot.

The light reflected from the signal surface of the disc 30 is received by the two photosensitive elements through the condensing lens 34 and the beam splitter 33. The output signals of the two photosensitive elements of the photo detector 35 is added by the adder 37 and then supplied to the adder 38 as one input signal. The output signals of the two photosensitive elements thereof are also supplied to the subtractor 36 in which the subtraction between the output signals of the two photosensitive elements thereof is performed to obtain a subtraction signal which is in turn supplied to the high-pass filter 39. The output signal of the high-pass filter 39 is supplied through the phase shift circuit 40 to the adder 38 as the other input signal.

Since the output signal of the adder 37 of the reproducing circuit shown in FIG. 15 corresponds to the signals obtained in the two photosensitive elements by photoelectric conversion of the reflected light from the signal surface of the disc 30 supplied through the condensing lens 34 and beam splitter 33 to the photo detector 35, the output signal corresponds to the output signal of the reproducing apparatus according to the LV system described with reference to FIG. 2A, and therefore, the output signal of the adder 37 of the FIG. 15 reproducing apparatus results in good reproduction of the low-frequency band signal component of the recorded signals as indicated by the curved line a in FIG. 3.

In the information signal recording medium according to the present invention, since the pit width W1 of the pit Pl caused by the information signal producing the longest recording wavelength $\Lambda l$, the pit width W2 of the pit Ps caused by the information signal producing the shortest recording wavelength $\Lambda s$, and the pit width W3 of the pit Pm caused by the information signal producing the recording wavelength $\Lambda m$ in-between the longest recording wavelength $\Lambda l$ and the shortest recording wavelength $\Lambda s$ are varied in dimension in accordance with recording wavelength as shown in FIGS. 10A, 10B and 10C, even if the recording wavelength becomes short, it is possible that the pit area with respect to the light spot for readout of the information signal is made similar to the pit area when the recording wavelength is long, and therefore, it is possible to obtain a diffraction effect (the diffracted direction is reverse) in the case of short recording wavelength as well as in the case of long recording wavelength, resulting in obtaining good response up to high frequency.

Namely, since the pit width W of the pit in the LV system described with reference to FIGS. 1A and 1B is constant irrespective of the length, of the recording wavelength, the intensity of diffracted light due to the pit is lowered when the recording wavelength is short as compared with the case that the recording wavelength is long. As a result, the modulation degree due to the pit is decreased when the recording wavelength is short. On the other hand, in the information signal recording medium according to the present invention, as obvious from FIGS. 10A, 10B and 10C, since the area of the pit in the case that the recording wavelength becomes short is increased by increase in pit width, the modulation degree is maintained a high state and the recording and reproduction of high-frequency signal components can be performed properly even when the recording wavelength becomes short.

Since the output signal of the subtractor 36 of the reproducing circuit shown in FIG. 15 is the difference signal between the signals obtained in the two photosensitive elements by photoelectric conversion of the reflected light from the signal surface of the disc 30 supplied through the condensing lens 34 and the beam splitter 33 to the photo detector 35, if the pit width is greater than the diameter of the light spot in all the range of the longest recording wavelength to the shortest recording wavelength, the output signal of the subtractor 36 corresponds to the output signal of the reproducing apparatus according to the differential system described with reference to FIG. 2B, and the MTF is obtained as being indicated by the curved line b in FIG. 3. In the information signal recording medium according to the present invention, since the pit width W1 of the pit Pl caused by the information signal producing the longest recording wavelength $\Lambda l$, the producing the shortest recording wavelength $\Lambda s$, and the pit width W3 of the pit Pm caused by the information signal producing the recording wavelength $\Lambda m$ in-between the longest recording wavelength $\Lambda l$ and the shortest recording wavelength $\Lambda s$ are varied in dimension in accordance with recording wavelength as shown in FIGS. 10A, 10B and 10C, and since the pit width W1 of the pit in the case of long recording wavelength is smaller in dimension than the diameter of the light spot, the MTF with respect to the low frequency signals becomes smaller as compared with the curved line b of FIG. 3. Furthermore, since the pit width W3 of the pit Pl caused by the information signal producing the recording wavelength $\Lambda m$ in-between the longest recording wavelength $\Lambda m$ and the shortest recording wavelengths s is also smaller in dimension than the diameter of the light spot, the MTF with respect to the middle frequency signals becomes smaller as compared with the curved line b of FIG. 3. However, since the pit width W2 of the pit Ps caused by the information signal producing the shortest recording wavelength $\Lambda s$ becomes substantially equal to the diameter of the light spot, the MTF with respect to the high frequency signals becomes substantially similar to the curved line b of FIG. 3. Although the MTF with respect to high frequency signal is low as indicated by a dotted line CED in FIG. 3, since in the differential system the noise of the semiconductor laser is cancelled by the differential operation and sufficiently high C/N can be obtained, the quality of signals is not deteriorated irrespective of amplification of the signals, and therefore it is possible to excellently perform the reproduction of the original signal waveform irrespective of a desired amplification.

The high-pass filter 39 to which the output signal of the subtractor 36 of the reproducing apparatus in FIG. 15 is supplied is provided for stopping the low-band differentiation type reproduction signal as indicated by the parameter $\lambda/a\Lambda = 0.2$ in FIG. 6. The signal in a low frequency band can be excellently obtained from the output signal of the adder 37, and therefore, it is not required to obtain it from the output signal of the subtractor 36. Furthermore, the phase shift circuit 40 is provided for cancelling 90° phase difference between the output signal of the subtractor 36 and the output signal of the adder 37.

Figure 16:
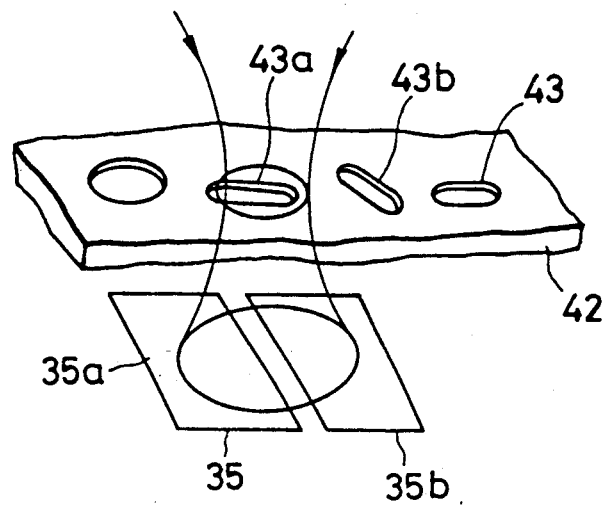
FIG. 16 shows a partial arrangement of a reproducing apparatus for optically reproducing information signals from a light passing type recording medium.

FIG. 16 shows one example of the arrangement of a reproducing apparatus for reproducing an information signal from the light passing type information signal recording medium. In FIG. 16, numeral 35 represents a photo detector divided into two in the direction that pits 43 are arranged and numerals 35a and 35b are respectively a photosensitive element. The reproduction signal with respect to a long pit 43a of pits recorded on an information signal recording medium 42 is obtained as the sum of the outputs of the photosensitive elements 35a and 35b. This is because the ratio of areas of the pit and land portions is optimal for modulation in the case that the recording wavelength is long. Furthermore, in terms of the pit such as pit 43b in the case of short recording wavelength, the diffraction effect due to the edge of the pit is detected as the difference signal between the output signals of the two photosensitive elements 35a, 35b of the photo detector 35. In this case, as well as the reflection type reproducing apparatus, the noise contained in the light source can be considerably cancelled.

The circuit arrangement coupled to and at the rear of the two photosensitive elements 35a, 35b of the photo detector 35 is the same as in the reproducing apparatus shown in FIG. 15. In the light passing type information signal recording medium, it is desired that the light path difference be about $\lambda/4$, and when the refractive index of the transparent material is n, it is required that the pit depth is $\lambda/\{4(n-1)\}$. This pit depth is approximately substantially equal to three times the pit depth of the reflection type information signal recording medium.

In an information signal recording medium according to this embodiment of the present invention, the pit width of pits recording information signals is varied in accordance with the recording wavelength, and the pit width of the pit in the region that the recording wavelength is long is substantially equal to one-third of the diameter of the light spot and the modulation degree due to diffraction caused by the pit becoming maximum with respect to the pit width, resulting in obtaining a good reproduction signal. Furthermore, the pit in the region that the recording wavelength is short is substantially equal to the diameter of the light spot, and as a result, the diffraction effect in the pit train direction becomes great and the modulation degree due to diffraction with respect to the numerical aperture of the condensing lens is increased, and the output signal can be properly obtained in the differential system using the output signal of the photosensitive elements divided into two in the pit string direction. In addition, the pit depth (or height) of the information signal recording medium of this invention is set to a value in-between the optimal value $\lambda/4$ of the pit depth (or height) in the LV system and the optimal value $\lambda/8$ of the pit depth (or height) in the differential system, i.e., about $\lambda/5.3$, and therefore, it is possible to reproduce information signals in wide frequency band. Furthermore, since the pit width of the pit caused by the low-frequency signal is smaller than the diameter of the light spot, when the tracking error occurs due to the shift of the reproducing spot from the center line of the pits, the reflected light is biased in the direction crossing the recorded traces and thereby it is possible to obtain a tracking error signal in accordance with the well known push-pull tracking method. This enables using an inexpensive reproducing apparatus applying the simplest push-pull tracking method, and it is possible to perform recording/reproducing of voice by the duty cycle modulation because the conventional LV system has a great MTF in low frequency band similarly.

Although in the above description the information signal recording medium is formed using the FIG. 11 optical information signal recording apparatus, the FIG. 11 recording apparatus results in difficulty of sufficiently meeting the requirements in terms of optical adjustments such as adjustment for coincidence in the optical axes of the two optical paths, adjustment for cancelling the phase difference between the two optical paths and adjustment of the astigmatic optical system having few focusing errors.

Figure 17:
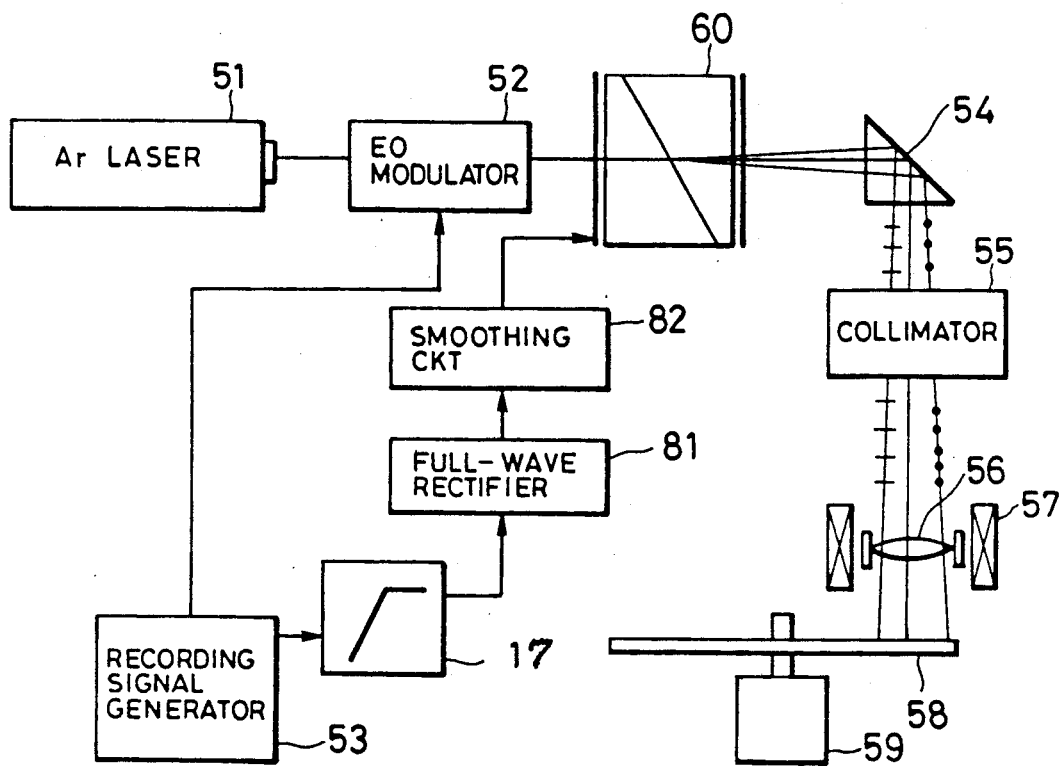
FIG. 17 is a block diagram showing an optical information signal recording apparatus according to an embodiment of the present invention.

FIG. 17 is a block diagram showing an optical information signal recording apparatus according to an embodiment of the present invention which is capable of avoiding these problems associated with optical adjustment. In FIG. 17, numeral 51 is an argon laser, 52 represents an EO modulator, and 53 designates a recording signal generator. Laser light emitted from the argon laser 51 is intensity-modulated in the EO modulator 52 in accordance with an information signal supplied from the recording signal generator 53 and then is incident on a deflection element 60. The deflection element 60 is made of an electro-optical crystal which divides the light in two directions symmetrically with respect to the optical axis in order to change the cross-sectional configuration of the light beam so that the pit width of a pit is varied in connection with the recording wavelength.

The light from the deflection element 60 is reflected by a right prism 54 and then the diameter of the light is expanded by a collimator 55, before being incident on a condensing lens 56, whereby a light spot is applied to a recording disc 58. Numeral 57 is an actuator of an automatic focusing control system for automatically performing control so that the condensing lens 56 is always positioned in the focusing condition with respect to the recording disc 58. The recording disc 58 is rotated by a motor 59 at a predetermined speed and recorded traces corresponding to the information signals are formed thereon.

FIGS. 18A, 18B and 18C are diagrams showing that the pit width of a pit corresponding to an information signal recorded on the recording disc 58 by the FIG. 17 optical information signal recording apparatus is varied in accordance with the recording wavelength. In the FIG. 17 optical information signal recording apparatus, the pit width is varied in dimension with the laser light beam from the EO modulator 52 being divided by the deflection element 60 into two.

FIGS. 19A, 19B, 19C and 19D are diagrams showing the principle in which the pit width is varied in dimension with the laser light beam being divided by the deflection element 60 into two. Of these drawings, FIG. 19A shows the radial energy distribution of a light spot formed by a light beam which is not deflected by the deflection element 60; 19C shows an Airy disc caused by the light beam of FIG. 19A; FIG. 19B shows the radial energy distribution of light spots formed with the light beam being divided into two by the deflection effect of the deflection element 60 to be separated from each other by a distance substantially equal to the diameter of the light spot; and FIG. 19D shows an Airy disc of the light spots of FIG. 19B.

Thus, in recording information signals on the recording disc 8, the deflection control according to the recording wavelength is performed for the light beam using the deflection element 60, and therefore, the pit width of a pit corresponding to an information signal recorded on the recording disc 58 by the FIG. 17 optical information signal recording apparatus is varied in accordance with the recording wavelength as shown in FIGS. 18A, 18B and 18C. The deflection control is performed in the deflection element 60 in response to a high-frequency signal component which is supplied from the recording signal generator 53 through a high-pass filter 61, a full-wave rectifier 81 and a smoothing circuit 82 thereto.

Figure 22:
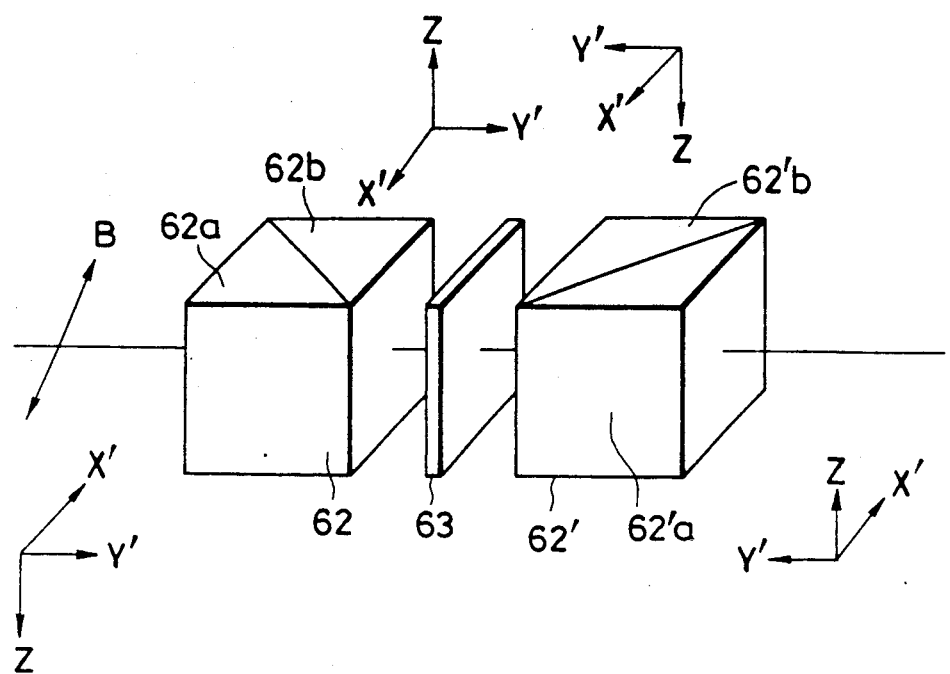
FIGS. 22 and 23 are diagrams showing another example of the deflection element of the FIG. 17 recording apparatus.
Figure 24:
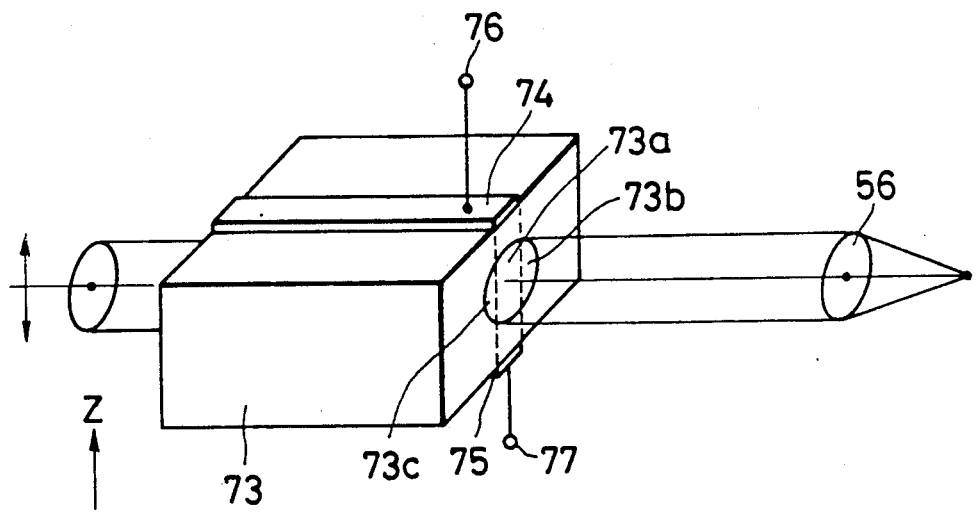
FIG. 24 is a diagram showing a further example of the deflection element of the FIG. 17 recording apparatus.

The deflection element 60 can be arranged, for example, as shown in FIGS. 20, 22 and 24.

The deflection element 60 of FIG. 20 causes S-polarized light and P-polarized light to be respectively deflected by an angle of θ in the directions separated from each other when an electric field is applied in the optical axis direction (FIG. 20 is an illustration of the deflection element 60 viewed from the deflection plane). If the focal length of the condensing lens 56 is f, the two light spots on the focusing plane are separated from each other by Δ given by the following equation (3).

$$\Delta = 2f \cdot \theta \tag{3}$$

Secondly, the operation of the deflection element 60 of FIG. 20 will be described with reference to FIG. 21. When the principal axes of the refraction ellipsoid in terms of an electro-optical crystal resulting in an isotropic crystal or a biaxial crystal from a single axis crystal by the action of electric field are the X-axis, Y-axis, and Z-axis and the Z-axis is positioned in the direction that the refractive index is not varied by the electric field, the deflection element 60 shown in FIGS. 20 and 21 comprises two triangle-pole-like prisms each having two surfaces that wherein the Z-axis and one axis intersect each other. The other oblique surface, and the oblique surfaces of the two triangle-pole-like prisms are attached to each other with the respective Z-axes being in parallel in opposite directions. That is, the deflection element 60 comprises a combined prism that symmetrically refracts the light, passing in the Z-axis direction, in two directions within the incident plane with respect to the attached surfaces. The two triangle-pole-like prisms are illustrated at references 60a and 60b in FIG. 21. For the two triangle-pole-like prisms 60a and 60b are used triangle-pole-prisms made of KDP (potassium dihydrogenphosphate $KH_2PO_4$) (KH20P4) crystal.

KDP is a uniaxial crystal wherein its Z-axis is the optical axis and results in a biaxial crystal in response to application of the electric field to the direction reverse, to the Z-axis direction. When the intensity of the electric field in the Z-axis direction is Ez, the electro-optic constant is γ63 and the ordinary ray refractive index is no, the refractive index n1 in the X'-axis direction dividing X and Y-axes into two equal parts and the refractive index n2 in Y'axis direction perpendicular to the X'axis direction are respectively expressed by the following equations (4) and (5)'.

$$n1 = no + (\gamma 63/2) no^3 Ez \tag{4}$$

$$n2 = no - (\gamma 63/2) no^3 Ez \tag{5}$$

Assuming that the linearly polarized light incident on the deflection element 60 from the left side in FIG. 21 is B, the X'-axis component (S) is transferred from the triangle-pole-like prism 60a of refractive index n1 to the triangle-pole-like prism 60b of refractive index n2 and therefore it is refracted downwardly as shown in FIG. 20. On the other hand, the Y'-axis component (P) is transferred from the triangle-pole-like prism 60b of refractive index n2 to the triangle-pole-like prism 60a of refractive index n1 and therefore it is refracted upwardly as shown in FIG. 20. These refraction are expressed by the following equations (6) and (7) in accordance with Snell's law.

$$\sin(\alpha + \theta')/\sin\alpha = n1/n2 \tag{6}$$

$$\sin(\alpha - \theta')/\sin\alpha = n1/n2 \tag{7}$$

The electro-optic constant γ63 of KDP is as small as $10.6 \times 10^{-12}$ m/v, and therefore sin 8 becomes approximately θ. θ can be obtained as follows using the equations (4) to (7).

$$\theta = \gamma 63 \cdot no^3 \cdot Ez \cdot \tan\alpha \tag{8}$$
$$= \gamma 63 \cdot no^3 \cdot V/D \tag{9}$$

where V is voltage and D is the width of a deflection element.

It is understood from above that the angle θ of deflection of the optical axis can be controlled in accordance with the voltage applied to the deflection element 60.

Now, when the focal length f of the condensing lens 56 is 1.5 mm and the width D of the deflection element is 4 mm, the applied voltage V to the deflection element 60 required on the focal plane is 0.2 μm is 14600 volts.

Using a plurality of deflection elements connected in series, it is possible to reduce the voltage applied to each of the deflection elements.

Figure 23:
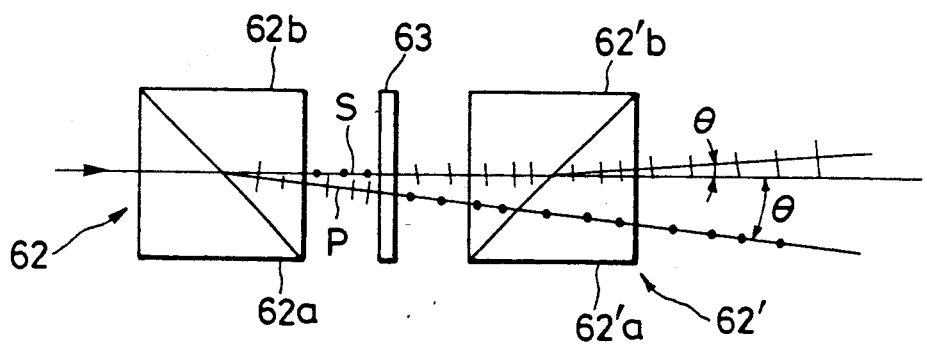

FIGS. 22 and 23 show another example of the deflection element comprising a first deflection element of parallel polarized light using an electro-optical crystal increasing the number of optical axes by action of the electric field, a second deflection element deflecting the light in a direction separated from the light deflected by the first deflection element, and a half-wave plate interposed between the two deflection elements to refract the light concurrently in two directions.

In FIGS. 22 and 23, numerals 62 and 62' respectively represent a unidirectional deflection prism, numeral 63 is a half-wave plate. The unidirectional deflection prism 62 comprises two triangle-pole-like prisms 62a and 62b made of KDP crystal. The Y'-axes of the two triangle-pole-like prisms 62a and 62b are coincident with the optical axis and the Z-axis directions are opposite to each other. The unidirectional deflection prism 62' comprises two triangle-pole-like prisms 62a' and 62b'. The unidirectional deflection 62 is turned out so that the normal line directions in the facing surfaces with respect to the Z-axes are opposite to each other.

In FIG. 22, when an electric field is applied upwardly to the unidirectional deflection prism 62 (a positive electrode is provided below the deflection element in the figure and a negative electrode is provided above the deflection element), the X-axis refractive index of the triangle-pole-like prism 62a becomes n1 expressed by the equation (4) and the X-axis refractive index of the triangle-pole-like prism 62b becomes n2 expressed by the equation (5), and therefore the linearly polarized light in the X-axis direction is refracted downwardly at the attached surfaces as shown in FIG. 23. The deflection angle θ is the same as in the equation (8), and the refractive index in Z-axis direction is constant irrespective of the direction of the electric field. Therefore, the linear deflection (S) in the Z-axis direction advances straightforwardly. When both the polarized light passes through the half-wave plate 63, the polarized directions are varied by 90 degrees.

On the other hand, when the electric field is applied downwardly to the unidirectional deflection prism 62', the P-polarized light in the X-axis direction is refracted upwardly as shown in FIG. 23 due to the variation of the refractive index n1 to the refractive index n2 at the boundary surface S-polarized light advances straightforwardly, the light is separated with respective angle $\theta$ as shown in FIG. 23. The deflection angle $\theta$ is controlled in accordance with the intensity of the electric field as well as in the equation (8).

When the length of the unidirectional deflection prism in the X direction is l and the thickness thereof in the Z direction is t, the deflection angle $\theta$ can be expressed by the following equation (10).

$$\theta = (l/Dt)no^3 \cdot \gamma 63 \cdot V \qquad (10)$$

The deflection element shown in FIGS. 22 and 23, as obvious from the equation (10), has a characteristic that the voltage sensitivity becomes high when the length l of the unidirectional deflection prism is made great, the width D of the deflection element is made narrow, that is, the angle $\alpha$ of the boundary surface is made great, and the thickness t of the unidirectional deflection prism in Z direction is made small. Furthermore, the electrodes may be provided at upper and lower surfaces and therefore it is not required to use transparent electrodes.

In the above description, although the unidirectional deflection prism 62' is positioned to turn out the unidirectional deflection prism 62, it is appropriate that the unidirectional deflection prism 62' is arranged in the same direction as in the unidirectional deflection prism 62, resulting in the operation similar to that of FIG. 23.

In the deflection elements shown in FIGS. 20 and 21 and FIGS. 22 and 23, the vibrating directions of the light divided into two directions are parallel and perpendicular to the direction that the recorded traces are arranged, and the condensing states and actions to the recording film are respectively slightly different from each other.

When the light from the deflection element 60 passes through a quarter-wavelength plate, since it is possible that both the linearly polarized light are changed to circularly polarized light which are reverse-rotated with respect to each other, the light spots formed are symmetrical with respect to the direction that the recorded traces are arranged.

When the deflection element 60 is not actuated, according to the deflection element shown in FIGS. 20 and 21, light spots are formed due to the linearly polarized light of the 45° direction. On the other hand, according to the deflection element shown in FIGS. 22 and 23, since therefrom emmitted is elliptic polarized light, the refractive index of the horizontal axis is no (ordinary ray refractive index) and the refractive index of the vertical axis is ne (extraordinary ray refractive index) and the direction of the axis is 45°. The spots formed thereby are thus symmetrical with respect to the optical axis.

FIG. 24 is a perspective view showing a further arrangement of the deflection element 60 which has unevenness on the light wave surface to expand the light spot. Numeral 73 is a KDP crystal having the Z-axis in the direction intersecting the optical axis. Numerals 74 and 75 are electrodes which are provided to divide the cross-section of light with a strong electric field portion and a weak electric field portion in the directions that the light is expanded. Numeral 73a represents a portion of the KDP crystal at which the electric field is applied, and numerals 73b and 73c designate portions at which the electric field is not applied.

Due to the difference between the intensities of the electric field in the KDP crystal in accordance with the voltage applied to terminals 76 and 77 connected to the electrodes 74 and 75, the optical path difference $\Delta$ expressed by the following equation (11) occurs.

$$\Delta = (no^3/2)l \cdot \gamma 63(V/t) \qquad (11)$$

Figure 25:
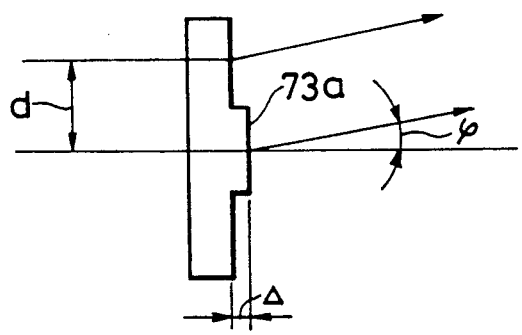
FIG. 25 is an illustration of a phase plate for describing the operation of the FIG. 24 deflection element.

The deflected direction of light incident on the deflection element is identical to the Z-axis direction, and the deflection element made of KDP crystal diffracts the light by the operation similar to that of a phase plate of FIG. 25 when voltage is applied through the terminals 76 and 77 to the electrodes 74 and 75. In FIG. 25, $\Delta$ is the optical path difference, d is the light distribution center of both sides of the central portion, and $\psi$ represents the diffracted direction, or angle. The convex portion corresponds to the portion 73a of the deflection element 73.

Figure 26:
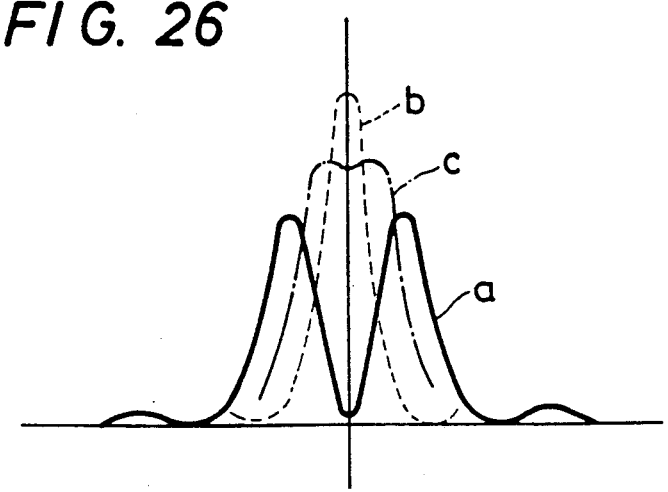
FIG. 26 is an illustration for describing energy distributions obtained by the FIG. 24 deflection element.

When the optical path difference $\Delta$ is half the light wavelength $\lambda$, the light incident on the condensing lens 56 becomes antiphase on the optical axis, and therefore, has two peak portions as indicated by the curved line a in FIG. 26. The peak values appear in $\pm \psi$ directions, i.e., at the positions of f·$\psi$. Furthermore, when the optical path difference $\Delta$ is zero, a light spot as indicated by the curved line b in the FIG. 26 is produced on the optical axis. Still further, when the optical path difference $\Delta$ is $0 < \Delta < \lambda/2$, the distribution as indicated by the curved line c in FIG. 26 is obtained.

As obvious from the equation (11), since the optical path difference $\Delta$ is controllable in accordance with the voltage, it is possible to desirably change the lateral width of the light spot. Now, when the length l of the deflection element in the X direction is 20 mm and the thickness t thereof in the Z direction is t, the voltage V to be applied is 6400 volts, and the light spot is formed by approximately half voltage and the light distribution in which the top portion is flat as the curved line c is obtained.

It should be understood that the foregoing relates to only embodiments of the invention, and that it is intended to cover all changes and modifications of the embodiments of the invention herein used for the purposes of the disclosure, which do not constitute departures from the spirit and scope of the invention.

What is claimed is:

1. An optical information signal recording apparatus for recording an information signal on an information signal recording medium by means of a pit formed in a geometric concave or convex configuration by irradiating a light spot obtained by condensing a light beam intensity-modulated in accordance with said information signal, the pit width of said pit being varied in accordance with a frequency of said information signal to be recorded, said recording apparatus comprising a deflection device made of an electro-optical crystal and placed within the intensity-modulated light beam path for dividing the intensity-modulated light beam symmetrically into two directions with respect to an optical axis of the intensity-modulated light beam, said deflection device changing a cross-sectional configuration of the intensity-modulated light beam by intensity-modulated light beam division so as to vary the pit width of said pit in accordance with the frequency of the information signal.

2. An optical information signal recording apparatus as claimed in claim 1, wherein said deflection device comprises tow triangle-pole-like prisms which are made of the electro-optical crystal and each of which has an axis, the refractive index of said prism being unaffected by an electric field in a direction of said optical axis, oblique surfaces of said two triangle-pole-like prisms being attached to each other so that the directions of said axes thereof are parallel and opposite to each other.

3. An optical information signal recording apparatus as claimed in claim 1, wherein said deflection device comprises a first light deflection element made of the electro-optical crystal and adapted to deflect light in a first direction, a second light deflection made of the electro-optical crystal and adapted to deflect light in a second direction opposite to said first direction, and a half-wave plate interposed therebetween in order to refract light concurrently in two directions.

4. An optical information signal recording apparatus as claimed in claim 1, wherein said deflection device has an axis whereby the refractive index thereof is not affected by an electric field in a direction of said axis thereof and is arranged such that said axis thereof perpendicularly intersects the optical axis of the intensity-modulated light beam and the cross-section of the intensity-modulated light beam passing therethrough is divided into two with a strong electric field and a weak electric field.

* * * * *